Patented Jan. 16, 1923.

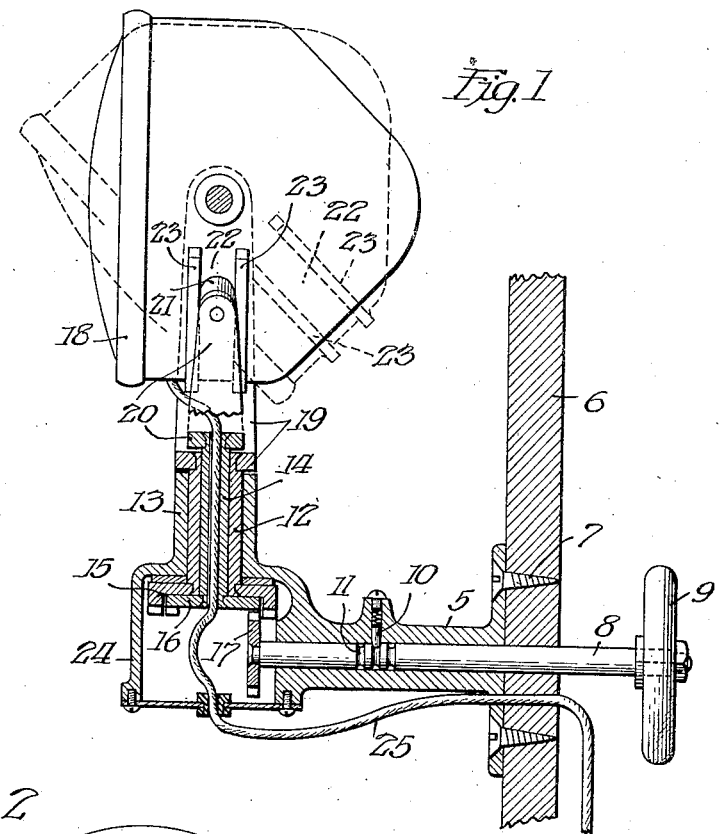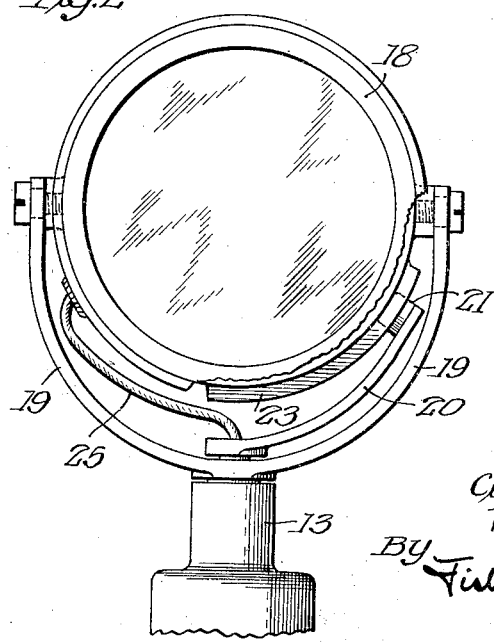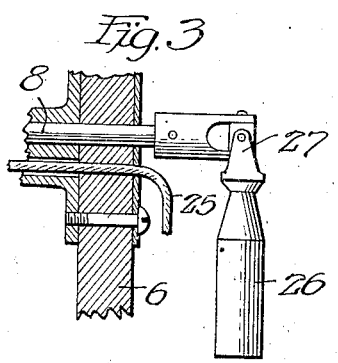

1,442,189

UNITED STATES PATENT OFFICE.

CLIVE K. STRAUSBAUGH AND WILLIAM McINTYRE, OF SHARON, PENNSYLVANIA.

LAMP SUPPORT.

Application filed April 7, 1921. Serial No. 459,229.

*To all whom it may concern:*

Be it known that we, CLIVE K. STRAUSBAUGH and WILLIAM McINTYRE, residing at Sharon, in the county of Mercer and State of Pennsylvania, have invented certain new and useful Improvements in Lamp Supports, of which the following is a specification.

This invention relates to lamp supporting and operating devices but more particularly to such as are adapted for use upon vehicles.

The primary object of the present invention is to provide a simple, compact and durable structure for attaching a spot-light to a closed vehicle which will permit the light to be conveniently controlled from the inside of the vehicle.

A further object is to provide a support which will permit the beam of light to be readily projected in substantially any direction by the operator but which will absolutely eliminate any shifting of the light by shock or vibration.

The many other objects and advantages of the invention will be better understood by reference to the following specification when considered in connection with the accompanying drawing illustrating a selected embodiment thereof, in which:—

Fig. 1 is a side elevation partially in section.

Fig. 2 is a front elevation, and

Fig. 3 is a detail view of a modified form of operating handle.

Referring to the drawing, the supporting bracket 5 is secured upon the outside of the frame or body 6 of the vehicle by screws 7 or other suitable means. A control rod 8 extends through this bracket and the body of the vehicle and is revoluble and slidable therein. A hand wheel 9 is secured upon the inner end of this rod. A spring pressed pin 10 in the bracket 5 yieldingly engages the rod 8 and is adapted to enter one of the annular grooves 11 in this rod to prevent accidental longitudinal movement of the rod.

A sleeve 12 is revolubly mounted in the vertical projection 13 of the bracket 5 and a hollow shaft 14 fits within this sleeve. A crown gear 15 is secured upon the lower end of the sleeve 12 and a similar gear 16 is fastened upon the corresponding extremity of the shaft 14. The teeth of the gears 15 and 16 lie substantially in the same plane. A spur-gear 17 upon the outer end of the rod 8 is adapted to selectively mesh with either of these crown gears.

The lamp 18 is trunnioned in the U-shaped support 19 secured upon the upper extremity of the sleeve 12. An arm 20 is secured upon the upper extremity of the shaft 14 and a cylindrical stud 21 on the outer extremity of this arm rests within the channel 22 formed by the parallel ribs 23 on the side of the lamp.

The operating gearing of the device is enclosed in a housing 24 formed in the bracket 5. The feed wiring 25 for the lamp passes through the hollow shaft 14 and enters the lamp at any suitable point.

A modified form of operating handle is shown in Fig. 3 of the drawing in which a handle 26 is connected by a universal joint 27 to the control rod 8.

The lamp is rocked upwardly and downwardly by rotating the hand wheel 9 when the spur-gear 17 is in engagement with the crown gear 16, as shown in the drawing. This spur-gear causes the arm 20 to be rotated about the axis of the shaft 14 and the movement of the stud 21 in the channel 22 rocks the lamp.

To swing the lamp in a horizontal plane, the handle 9 is grasped and the rod 8 pulled inwardly to bring the spur-gear 17 into mesh with the crown gear 15. The spring pressed pin 10 which was forced out of the intermediate annular groove 11 by the pull exerted on the rod 8, now engages the outer of such grooves and retains the gears 15 and 17 in mesh. Rotation of the rod 8 in this position will cause the lamp support 19 to revolve upon the axis of the sleeve 12. To release the gears 15 and 16 from the spur-gear 17 and thus permit the sleeve 12 and the shaft 14 to rotate freely, the rod 8 is pushed outwardly to bring the pin 10 into engagement with the inner of the grooves 11.

The bracket rigidly supports the lamp in the proper position and eliminates the shifting produced by shock or vibration so commonly occurring in devices of this nature having frictional joints or clamps.

We are aware that numerous changes in the form and arrangement of parts may be made without departing from the spirit of our invention and we reserve the right to make all such as fairly fall within the scope of the following claims.

We claim:

1. In a device of the class described, a fixed bracket, a lamp support revoluble about a vertical axis in said bracket, a lamp revolubly mounted on said support, and a control rod for selectively rotating said support on said bracket and said lamp on said support by the rotation of said rod.

2. In a device of the class described, a fixed bracket, a lamp support revoluble about a vertical axis in said bracket, a lamp revolubly mounted on said support, and a control rod revolubly and slidably mounted in said bracket for selectively rotating said support on said bracket and said lamp on said support by the rotation of said rod.

3. In a device of the class described, a fixed elbow shaped bracket, a lamp support revolubly mounted on said bracket, a lamp revolubly mounted on said support, an operating gear for said support, an operating gear for said lamp, and a central rod for selectively actuating said gears.

4. In a device of the class described, a fixed elbow shaped bracket comprising an outer vertical tubular portion and an inner horizontal tubular portion connected to form a continuous enclosed passage, a lamp support revolubly mounted in the outer portion of said bracket, a lamp revolubly mounted on said support, and means extending through said passage for operating said support and said lamp.

5. In a device of the class described, a fixed elbow shaped bracket comprising an outer vertical tubular portion and an inner horizontal tubular portion connected together and forming a continuous enclosed passage, a lamp support revolubly mounted in the outer portion of said bracket, a lamp revolubly mounted on said support, and a control rod extending through said passage for operating said support and said lamp.

6. In a device of the class described, a lamp support revoluble about a vertical axis, a lamp mounted on said support and revoluble about a horizontal axis, and a control rod revoluble about a horizontal axis to actuate selectively said support and said lamp.

7. In a device of the class described, a tubular bracket, a sleeve fitting within the outer end of said bracket and revoluble therein, a lamp support on said sleeve, a lamp revolubly mounted on said support, a shaft revoluble within said sleeve, an arm mounted on the outer extremity of said shaft and engaging said lamp to cause said lamp to be rotated on said support by the rotation of said shaft, and a control rod in the inner end of said bracket, adapted to be operatively connected with either said shaft, or said sleeve.

8. In a device of the class described, a fixed elbow shaped bracket, a lamp support revoluble about a vertical axis in said bracket, a lamp revolubly mounted in said support, a manually operable control rod, and means interposed between said rod, said support, and said lamp to permit said support and said lamp to be actuated by said rod.

9. In a device of the class described, a fixed elbow shaped bracket, a lamp support revoluble about a vertical axis in said bracket, a lamp revoluble in said support, a control rod for said support and said lamp revolubly mounted in said bracket, and means for operatively connecting said rod with said support and said lamp to cause said support and said lamp to be rotated by the rotation of said rod.

CLIVE K. STRAUSBAUGH.
WILLIAM McINTYRE.